Patented July 8, 1947

2,423,751

UNITED STATES PATENT OFFICE 2,423,751

METHOD OF SEPARATING POLYMERS OF HEAT POLYMERIZED DRYING OIL

Isidor M. Bernstein, Brooklyn, N. Y., assignor, by mesne assignments, to H. D. Roosen Company Inc., Brooklyn, N. Y., a corporation of Delaware No Drawing. Application August 29, 1944, Serial No. 551,786

4 Claims. (Cl. 260—428.5)

This invention relates to the selective separation of polymers of different molecular weights occurring in heat polymerized drying and semi-drying vegetable and fish oils known as stand oils and has for an object to provide separation products having novel properties and a novel and improved method of obtaining the same.

The present invention provides a method by which "stand oils" may be separated into two, three, four, or five fractions of progressively increasing molecular weight, the number of fractions depending on the extent of the heat polymerization of the drying or semi-drying oil. Such fractions are of value in the printing ink industry as vehicles possessing non-livering properties when used for dispersing reactive pigments such as Persian Orange, Peacock Blue, Orange Mineral, etc., and in the paint and varnish industry as vehicles or superior drying properties.

The present method is based on the discovery that the homolgous series of saturated aliphatic primary alcohols from $C_3$ to $C_6$ in carbon chain length inclusive possess different solubilities not only for the monomeric oil molecules remaining at any stage of the heat polymerization but also for the various polymers of progressively increasing molecular weight formed by the heat polymerization process. The selective solubility of the progressively increasing molecular weight polymers in the series of saturated aliphatic primary alcohols corresponds with increase in carbon chain length of the alcohols.

Thus, for example in a sample of a 585° F. heat polymerized linseed oil carried to a viscosity of approximately 180 poises, N-propyl alcohol at room temperature extracts substantially all the remaining monomeric, N-butyl alcohol substantially all the linear and branched dimeric, N-amyl alcohol substantially all the linear and branched trimeric, and N-hexyl alcohol substantially all the linear and branched tetrameric linseed oil molecules from the successive remainders of the "stand oil." The final residue consists substantially of insoluble cross-linked higher polymers which may be further purified by extraction with petroleum ether (30–60° C. boiling range) or other light fraction petroleum naphtha in the boiling range of 20–130° C.

It is of course obvious that only in a highly polymerized "stand-oil" such as in the above example will it be possible to separate five fractions. If the drying or semi-drying oil has not been polymerized past the dimeric stage only the N-propyl alcohol monomeric, and the N-butyl alcohol dimeric separations will be possible. Likewise if the oil has not been polymerized past the trimeric stage, only the N-propyl monomeric, the N-butyl dimeric, and the N-amyl trimeric separations can be effected.

The method may be used in an alternate way. Instead of treating one sample of the viscous "stand oil" with successive quantities of the various saturated normal aliphatic alcohols as outlined above, a sample of the "stand oil" may be extracted with N-butyl alcohol which will separate substantially the monomeric and dimeric polymers together as one fraction from the remainder of the more highly polymerized drying and/or semi-drying oils, or with N-amyl alcohol which will separate substantially the monomeric, dimeric, and trimeric polymers as one fraction from the more highly polymerized remainder. Thus the separation may take place in different sequences as desired.

The viscous heat polymerized oils referred to herein as "stand oil" are those made by the usual heat-polymerization method, i. e., by heating the drying or semi-drying oil in the temperature range of 450° F.–600° F. for a sufficient time interval depending on the reactivity of the oil used, on the presence or absence of air and on the presence or absence of polymerization catalysts as is well known in the art.

Suitable drying oils for this treatment are (1) natural drying or semi-drying oils such as linseed, perilla, tung, oiticica, soya bean, sunflower seed, fish, milkweed seed, etc., (2) the fractionated or segregated more highly unsaturated portions of the above natural drying or semi-drying oils, (3) isomerized conjugated drying oils such as those made by the treatment with sodium or potassium hydroxide of the above natural drying and semi-drying oils, (4) dehydrated conjugated drying oils made by the dehydration of a natural hydroxylated oil such as castor oil or of artificially hydroxylated drying and semi-drying oils of the classes above mentioned, and (5) synthesized drying oils such as those made by the esterification of the polyhydric alcohols, as for example pentaerythritol and mannitol, with the drying oil or semi-drying oil fatty acids of the oils listed above.

The following is an example of my fractional separation process.

To 75 parts of a viscous "stand oil" resulting from the heat polymerization of linseed oil at 585° F. for 9 hours in an inert atmosphere, are added, at room temperature, 400 parts of N-propyl alcohol. The liquid mixture is thoroughly shaken or stirred in a batch operation, or by countercurrent flow method in a continuous operation. The N-propyl alcohol layer is removed, and the residue washed once or more with 400 parts N-propyl alcohol. The combined N-propyl alcohol extracts which contain substantially all the monomeric oil molecules, are subjected to distillation to recover the N-propyl alcohol and the monomeric oil.

To the residue of the "stand oil" after the N-propyl alcohol extraction, 400 parts of N-butyl alcohol are added, shaken, separated and washed. The combined extracts which contain substantially all the dimeric oil molecules, are subjected to distillation to recover the N-butyl alcohol and the dimeric oil.

The same extraction operation is performed successively with N-amyl alcohol and N-hexyl alcohol to recover substantially all of the trimeric and tetrameric oil respectively. The residue if any consists substantially of cross-linked polymers which may be further extracted with light fraction petroleum naphtha to remove the oily fraction as set forth in my copending application above identified.

It will be understood that certain steps may be omitted if it is not required that each fraction be separated and that fractions consisting of a selected group of polymers may be obtained.

The other stand oils may be treated in a similar manner and it is to be understood that they may be substituted for linseed oil stand oil in the above example.

Although a specific embodiment of the invention has been described it is to be understood that the invention is capable of various uses and that changes and modifications may be made therein as will be apparent to a person skilled in the art. The invention is only to be limited in accordance with the following claims.

What is claimed is:

1. The method of separating polymeric fractions of heat polymerized drying oil which comprises extracting said polymerized oil successively with progressively higher homologues of a saturated aliphatic primary alcohol, said alcohol and homologues having from three to six carbon atoms, and separating the respective extractions.

2. The method of separating polymeric fractions of heat polymerized drying oil which comprises extracting said polymerized oil successively with N-propyl alcohol and its progressively higher homologues and separating the respective extractions.

3. The method of separating polymeric fractions of heat polymerized linseed oil which comprises extracting said polymerized oil successively with progresively higher homologues of a saturated aliphatic primary alcohol, said alcohol and homologues having from three to six carbon atoms, and separating the respective extractions.

4. The method of separating polymeric fractions of heat polymerized linseed oil which comprises extracting said polymerized oil successively with N-propyl alcohol and its progressively higher homologues and separating the respective extractions.

ISIDOR M. BERNSTEIN.

REFERENCES CITED

The following references are of record in the file of this patent:

UNITED STATES PATENTS

| Number | Name | Date |
|---|---|---|
| 2,304,074 | Cherry | Dec. 8, 1942 |
| 2,219,862 | Bradley | Oct. 29, 1940 |
| 2,239,692 | Behr | Apr. 29, 1941 |
| 2,166,103 | Behr | July 18, 1939 |